(12) United States Patent  
Winkler

(10) Patent No.: US 8,142,139 B2  
(45) Date of Patent: Mar. 27, 2012

(54) FAN UNIT HAVING AN AXIAL FAN WITH IMPROVED NOISE DAMPING

(75) Inventor: Wolfgang Arno Winkler, St. Georgen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 663 days.

(21) Appl. No.: 12/334,558

(22) Filed: Dec. 15, 2008

(65) Prior Publication Data

US 2009/0191054 A1    Jul. 30, 2009

(30) Foreign Application Priority Data

Jan. 25, 2008 (DE) .................... 20 2008 001 613 U

(51) Int. Cl.
| | |
|---|---|
| F03D 11/00 | (2006.01) |
| F03D 1/04 | (2006.01) |
| F03D 5/00 | (2006.01) |
| F04D 11/08 | (2006.01) |
| F04D 29/54 | (2006.01) |

(52) U.S. Cl. ..................... 415/119; 415/220; 415/211.2; 415/121.2

(58) Field of Classification Search .................. 415/119, 415/211.2, 220, 60, 61, 1, 108, 208.2, 4.3, 415/121.2, 48, 75, 173.3, 146; 416/215.1
See application file for complete search history.

(56) References Cited

U.S. PATENT DOCUMENTS

| | | | | |
|---|---|---|---|---|
| 3,820,916 | A | * | 6/1974 | Agushev et al. ........... 415/149.3 |
| 6,507,135 | B1 |   | 1/2003 | Winkler ......................... 310/91 |
| 6,729,839 | B1 | * | 5/2004 | Illingworth et al. .............. 415/1 |
| 7,189,053 | B2 |   | 3/2007 | Winkler et al. ............... 415/108 |
| 7,950,811 | B2 | * | 5/2011 | Nagahata et al. ............. 353/119 |

FOREIGN PATENT DOCUMENTS

| | | |
|---|---|---|
| DE | 197 46 185 | 4/1999 |
| DE | 10 2004 033215 | 2/2005 |
| DE | 20 2005 011 514 | 11/2005 |
| DE | 10 2005 051 853 | 6/2007 |
| DE | 10 2006 004 465 | 8/2007 |
| WO | 00-013294 | 3/2000 |

* cited by examiner

*Primary Examiner* — Chuong A. Luu  
(74) *Attorney, Agent, or Firm* — Milton Oliver, Esq.; Oliver Intellectual Property LLC

(57) ABSTRACT

Due to variations arising during manufacturing, axial fans often are slightly imbalanced, resulting in noise during operation, which is undesirable in many contexts, for example when the fan is used for ventilation purposes in a motor vehicle. A fan with improved vibration and noise damping can be achieved by elastically suspending the fan wheel within a first ring formed of a hard plastic, the first ring having a tubular extension formed of a softer plastic, and serving to mechanically connect the first ring to a surrounding annular carrier part. Optionally, the first ring and extension unit can include a spring element. Preferably, the first ring and tubular extension are produced by a multi-component forming technology such as two-plastic technology. The fan is preferably driven by an electronically commutated motor (ECM).

19 Claims, 17 Drawing Sheets

US 8,142,139 B2

FAN UNIT HAVING AN AXIAL FAN WITH IMPROVED NOISE DAMPING

CROSS-REFERENCE

This application claims priority from my German application DE 20 2008 001 613.4, filed 25 JAN. 2008, the disclosure of which is hereby incorporated by reference.

FIELD OF THE INVENTION

The present invention relates to a fan unit having an axial fan.

BACKGROUND

Axial fans, and fans in general, usually have a manufacturing-related imbalance that can result in undesirable vibration when they are operated. Obtrusive noise can moreover be caused by motor and air-flow noise produced by the fan. This undesirable vibration and obtrusive noise must be damped, especially in convenience-related applications.

SUMMARY OF THE INVENTION

It is therefore an object of the present invention to provide a novel fan unit having an axial fan with improved noise-damping features. This object is achieved by a fan structure defining an airflow passage or channel in which the fan hub and blades are suspended. The suspension employs a first ring, made of a hard plastic, which has at least one tubular extension, made of a soft plastic, serving as a noise-damping mechanical connection to an annular carrier part. A very compact configuration is achieved in this context by the use of the first ring equipped with the tubular extension. This configuration exhibits improved vibration and noise damping because of the joining of the first ring made from a hard plastic to the tubular extension made from a soft plastic.

Preferred refinements of the fan according to the present invention are described in more detail below.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
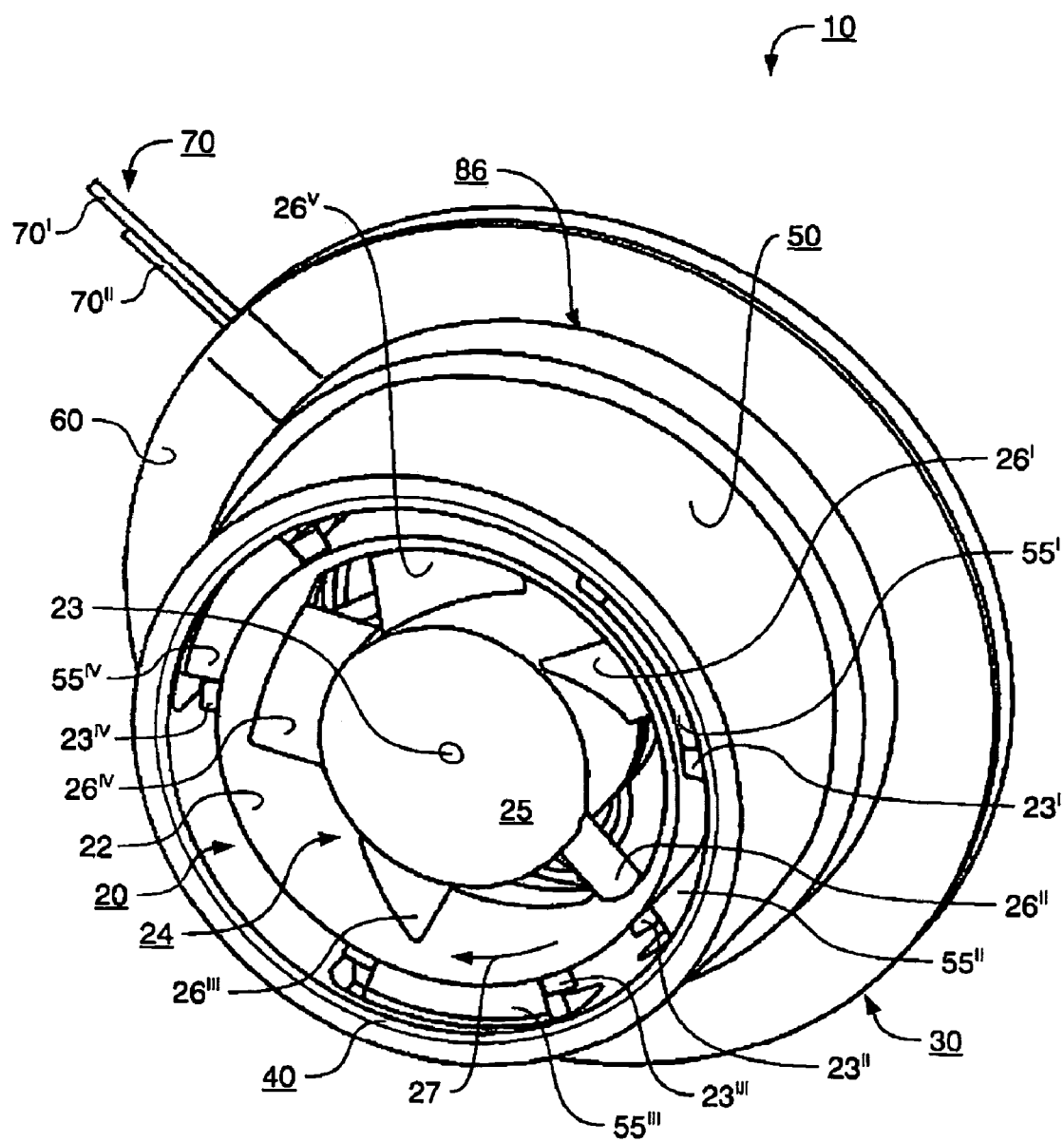
FIG. 1 is a perspective view of the back side of a fan unit having an axial fan, in accordance with a first embodiment.

In the description that follows, the terms "left," "right," "front," "rear," "upper," and "lower" refer to the respective figure of the drawings, and can vary from one figure to the next as a function of a particular orientation (portrait or landscape) that is selected. Identical, or identically functioning, parts are labeled with the same reference characters in the various figures, and usually are described only once.

FIG. 1 shows, in a rear view, a first embodiment of a fan unit 10 having an axial fan 20 and a vibration- and noise-damping apparatus 30. Axial fan 20 has an approximately hollow-cylindrical airflow or air-guiding tube 22 that can be made from plastic or metal, or any mixed form thereof. Provided on the outer circumference of air-guiding tube 22 are several suspension members 23 made of an elastomeric material, of which suspension members 23 to 23r are visible in FIG. 1. Arranged in the interior of air-guiding tube 22 is a fan wheel 24 that is arranged rotatably about a rotation axis 23 which proceeds along the longitudinal axis of air-guiding tube 22. Fan wheel 24 has fan blades 26' to $26^V$, the shapes of which are adapted to the shape of the inner side or surface of air-guiding tube 22.

Fan 20 has a motor 21 (FIGS. 4 and 5) to drive its fan wheel 24. Motor 21 is preferably implemented as an electronically commutated external-rotor motor. It has a rotor cup 25 (FIG. 1) on which fan wheel 24 is mounted. A mounting flange 38 (FIG. 2), which is joined to air-guiding tube 22 via thin holding struts 29 to $29^{III}$ (FIG. 2) as described with reference to FIG. 2, serves for installation of motor 21 in air-guiding tube 22.

Motor 21 is connected to a flexible electrical connector lead 70. The latter is soldered onto a circuit board 90 (FIG. 5) of motor 21. Fan 20 has two leads 70' and 70" for supply of an operating voltage. In many cases, further leads are provided, for example for input of a target speed signal or for output of an alarm signal.

Figure 5:
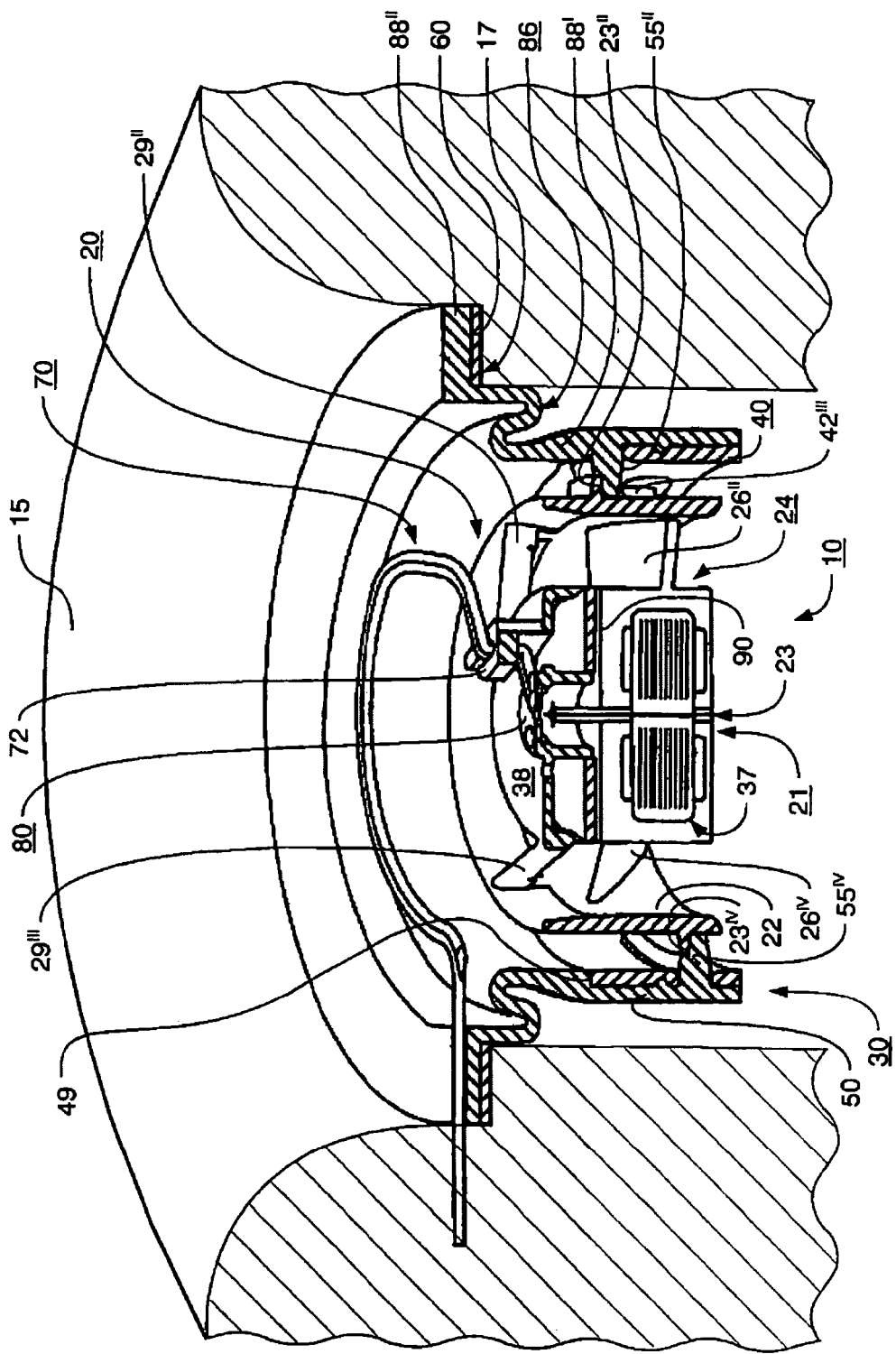
FIG. 5 is a sectioned view of the fan unit of FIG. 1.

As is evident from FIG. 1, fan or blower 20 is arranged in vibration- and noise-damping apparatus 30. The latter has a first ring 40 for elastic suspension of fan 20, a tubular extension 50 joined thereto for oscillation damping, and a second ring 60 for joining fan unit 10 to a carrier part 15 (FIG. 5). First ring 40 thus carries fan 20 and is therefore hereinafter also referred to as a "carrier ring." Extension 50 is braced, relative to the carrier part, on second ring 60. This ring is therefore also referred to as a "bracing ring." Tubular extension 50 is preferably implemented as a bellows, and has a spring element 86 having a predetermined oscillation characteristic for vibration damping and noise damping, as described in detail with reference to FIG. 3.

According to a preferred embodiment, carrier ring 40, tubular extension 50, and bracing ring 60 are implemented as a physical unit using multi-component forming technology, in particular using so-called two-plastic technology. Carrier ring 40 and bracing ring 60 are preferably made from a hard plastic, and tubular extension 50 from a soft material. Tubular extension 50 can be joined to carrier ring 40 and/or to bracing ring 60, for example, by injection molding, by a clamping join, by an adhesive join, or by plastic welding.

Several securing members 55 made of a hard plastic are provided on carrier ring 40 in order to secure the suspension members 23; of these, securing members 55 to 55$^{IV}$ are visible in FIG. 1. Securing members 55 can also be made at least in part, on the inner circumference of tubular extension 50, from a soft plastic, as described with reference to FIGS. 3 and 7.

During the operation of axial fan 20, motor 21 drives fan wheel 24 in such a way that the latter rotates about its rotation axis 23, for example in the direction of an arrow 27 (FIG. 1), in order to generate an air flow. The undesirable vibration and noise resulting, for example, from an imbalance of fan 20, are damped in this context by apparatus 30, as described with reference to FIG. 5.

Figure 2:
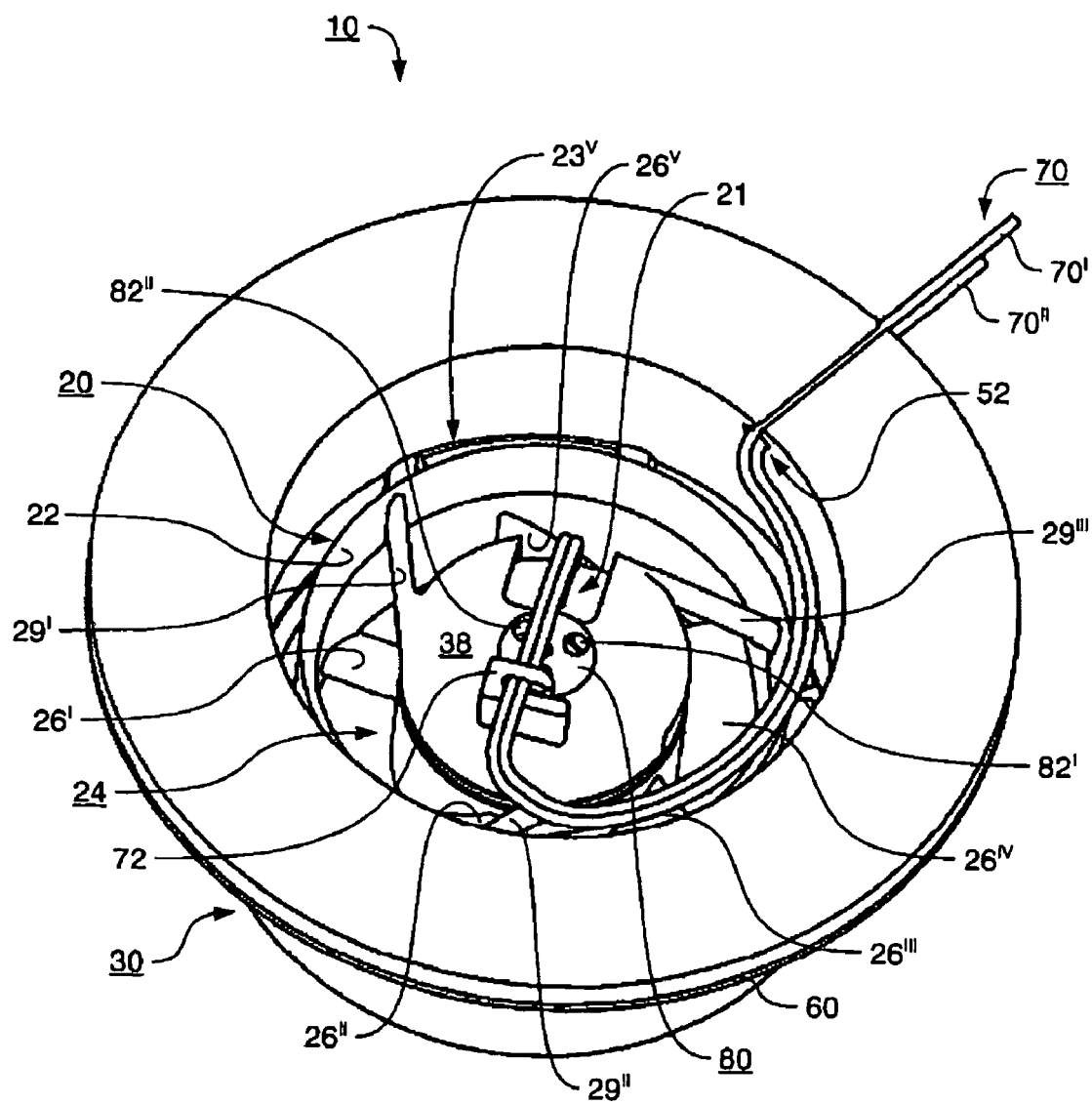
FIG. 2 is a perspective view of the front side of the fan unit of FIG. 1.

FIG. 2 is a front view of fan unit 10 of FIG. 1 showing a further suspension member 23'; also illustrated is the installation of motor 21, associated with fan 20 for driving fan wheel 24, on a flange plate 38 mounted on air-guiding tube 22, which plate is joined to air-guiding tube 22 via thin holding struts 29' to 29$^{III}$. A bearing element 80, for example a bearing tube, on which the rotor of motor 21 is journaled, is arranged on flange 38. Element 80 is mounted on flange 38 with three screws 82, of which only screws 82' and 82", are visible in FIG. 2.

FIG. 2 also shows the cable routing of connector lead 70. The latter is routed from motor 21, over flange 38 (where it is mounted on a holder 72) to the inner wall of tubular extension 50, along it to an opening 52, and through the latter outward in a radial direction.

Figure 3:
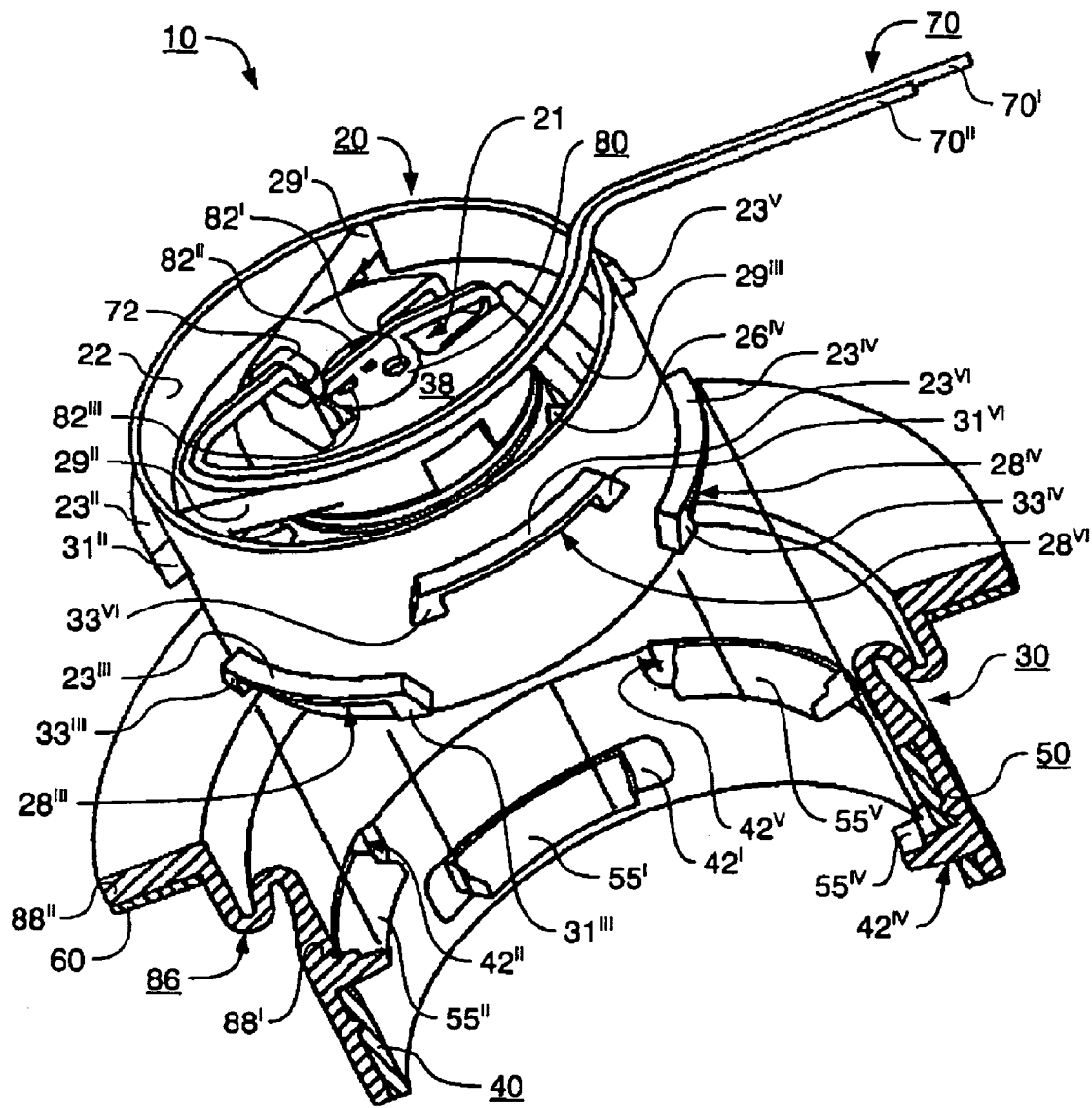
FIG. 3 is a partly sectioned exploded view of the fan unit of FIG. 1.

FIG. 3 shows an embodiment in which securing members 55, made of a soft plastic, are implemented as an integral component of tubular extension 50, which latter at least partly surrounds carrier ring 40. Carrier ring 40 has apertures 42, of which only apertures 42', 42", 42$^{IV}$, and 42$^V$ are visible in FIG. 3; and through which securing members 55 extend.

In FIG. 3, securing members 55 are implemented as support elements on which suspension members 23 are supported after fan unit 10 is assembled. Apertures 42 are preferably implemented in such a way that suspension members 23 at least partly engage therein, in order to ensure jamming or hooking into apertures 42, and thus stable support on the associated support elements.

Securing members 55, implemented as support elements, are implemented with groove-shaped cutouts 28 and reinforced side regions 31, 33. For example, support element 23$^{VI}$ has a groove-shaped cutout 28$^{VI}$ and reinforced side regions 31$^{VI}$ and 33$^{VI}$.

As is apparent from FIG. 3, bearing element 80 has a further mounting element 82''', and spring element 86 is arranged between a hollow-cylindrical portion 88' and a collar 68" of tubular extension 50. Portion 88' is joined to carrier ring 40, and collar 88" is joined to bracing ring 60. Spring element 86 has a predetermined oscillation characteristic, in order to enable relative motion between carrier ring 40 and bracing ring 60, for vibration damping and noise damping, and, in accordance with a first embodiment, is implemented as a curved, approximately S-shaped oscillation membrane.

Figure 4:
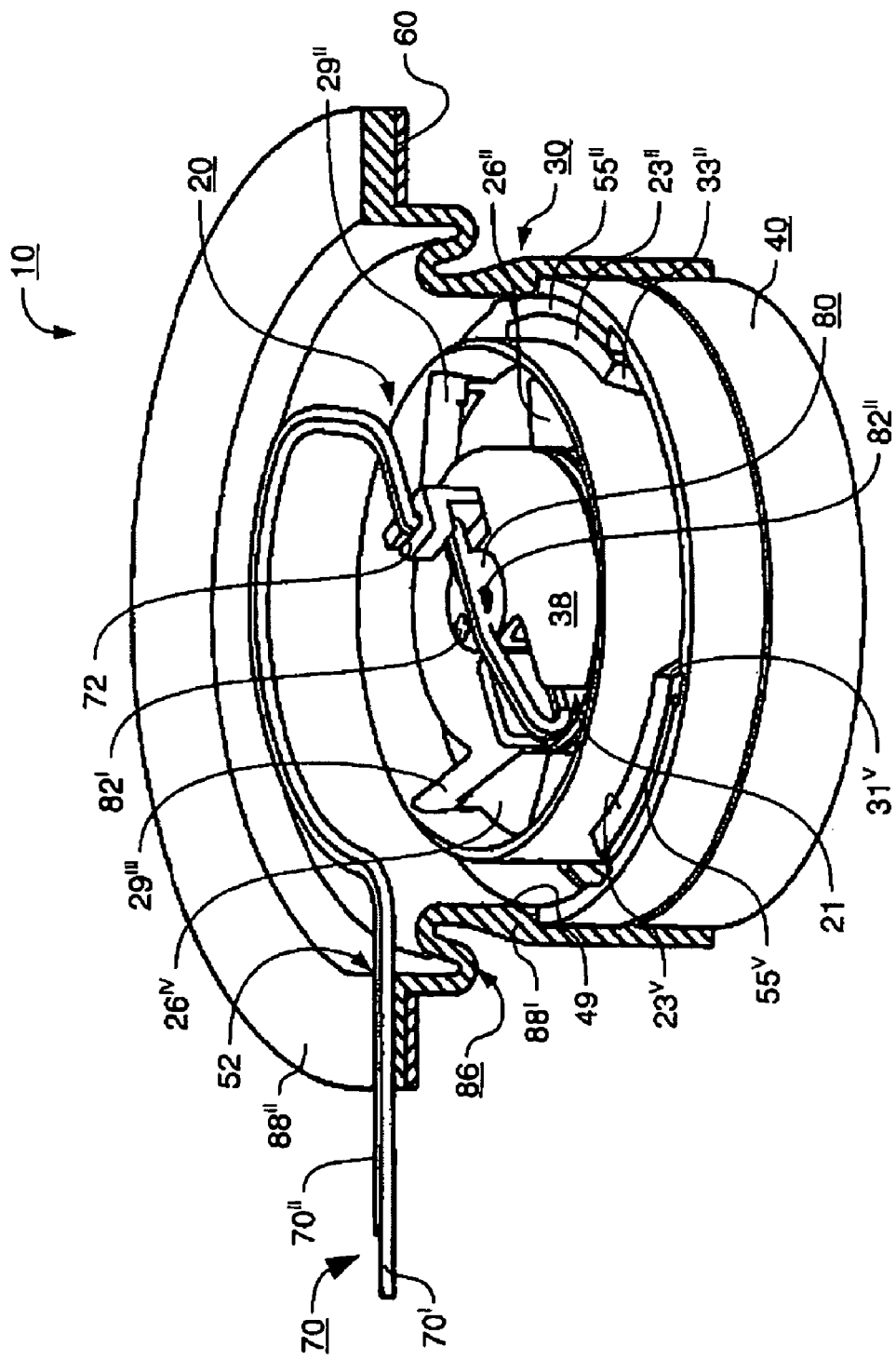
FIG. 4 is a partly sectioned perspective view of the fan unit of FIG. 1.

FIG. 4 is a partly sectioned perspective view of fan unit 10. FIG. 4 illustrates, on the one hand, suspension members 23 supported on securing members 55 and, on the other hand, an annular shoulder 49 against which carrier ring 40 abuts.

FIG. 5 shows fan unit 10 arranged in a carrier part 15. Carrier part 15 is made, for example, from foamed material such as that which is used to upholster a vehicle seat. Fan unit 10 can serve in this context to ventilate or heat the seat, the unit being recessed (as shown) into carrier part 15 in order to ensure a predetermined spacing between collar 88" and a corresponding seat surface.

FIG. 5 furthermore shows motor 21 having a stator arrangement 37 and a circuit board 90 to which connector lead 70 is connected. Motor 21 can be implemented using any desired electronically commutated electric motor that is suitable for driving axial fan 20, so that a detailed description of motor 21 can be dispensed with.

FIG. 5 illustrates, in particular, the suspension of air-guiding tube 22 in vibration- and noise-damping apparatus 30 by means of suspension members 23 supported on securing members 55, only suspension members 23" and 23$^{IV}$ supported respectively on securing members 55" and 55$^{IV}$ being visible. These interact in such a way that oscillations of fan 20 are compensated for by relative motions of spring element 86 between carrier ring 40 and bracing ring 60, so as thereby to produce efficient vibration damping and noise damping for fan unit 10. Apparatus 30 has, for this purpose, a predetermined number of degrees of freedom in both the horizontal and the vertical directions.

Figure 6:
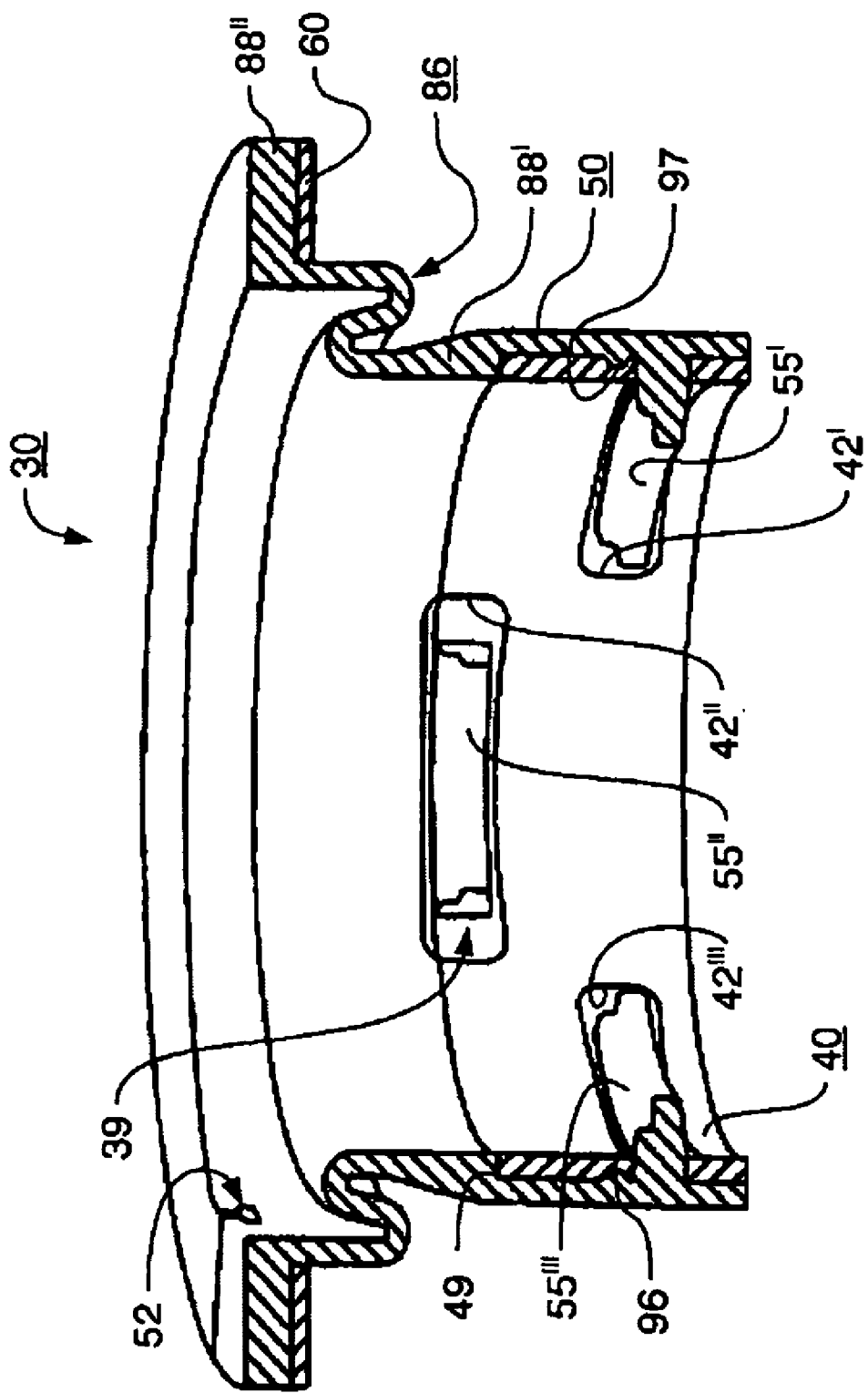
FIG. 6 is a sectioned view of the bellows of FIG. 1 joined to a carrier ring 40.

FIG. 6 is a sectioned view of vibration- and noise-damping apparatus 30 in accordance with an embodiment. FIG. 6 illustrates securing members 55' to 55''', provided on tubular extension 50, which engage through apertures 42' to 42''' provided in carrier ring 40. FIG. 6 also shows an annular projection 97 provided on extension 50, which projection engages into an annular groove 96, provided on carrier ring 40, in order to ensure a slip-proof join between carrier ring 40 and extension 50.

Figure 7:
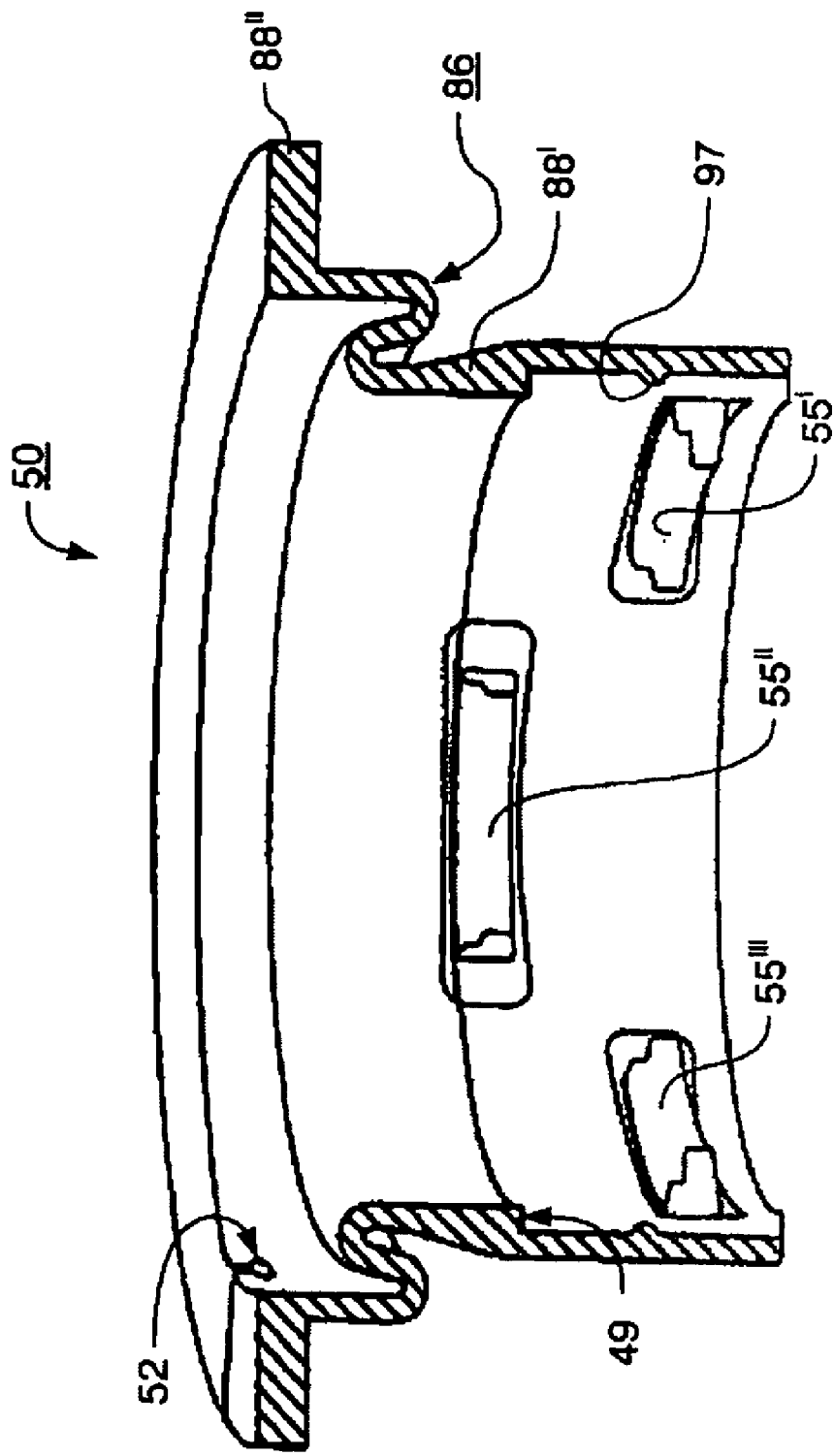
FIG. 7 is a sectioned view of the bellows of FIG. 1.

FIG. 7 is a sectioned view of tubular extension 50 illustrating securing members 55' to 55''' provided-thereon, as well as annular projection 97 and annular shoulder 49.

Figure 8:
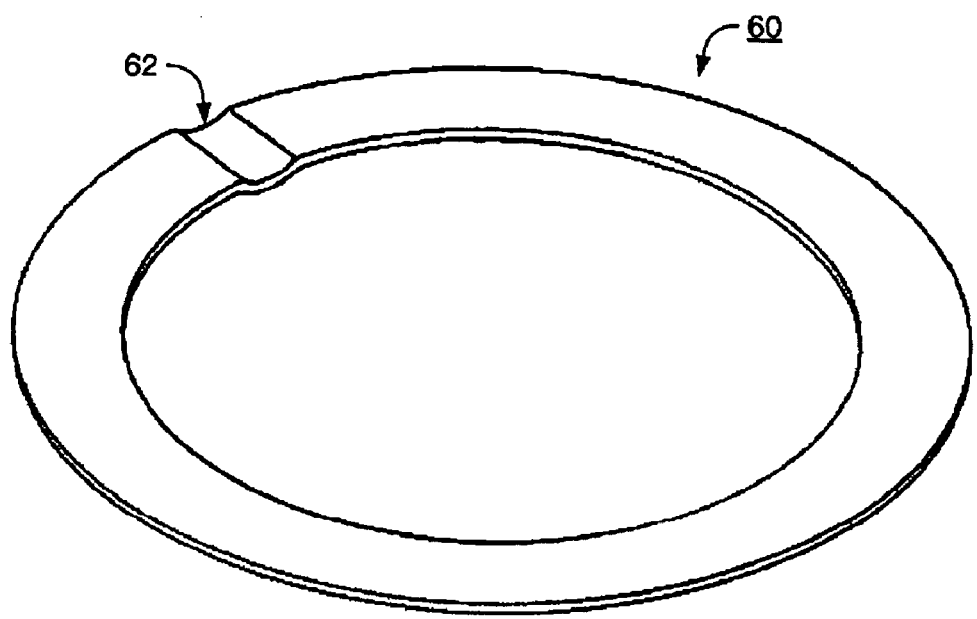
FIG. 8 is a perspective view of bracing ring 60 of FIG. 1.
Figure 9:
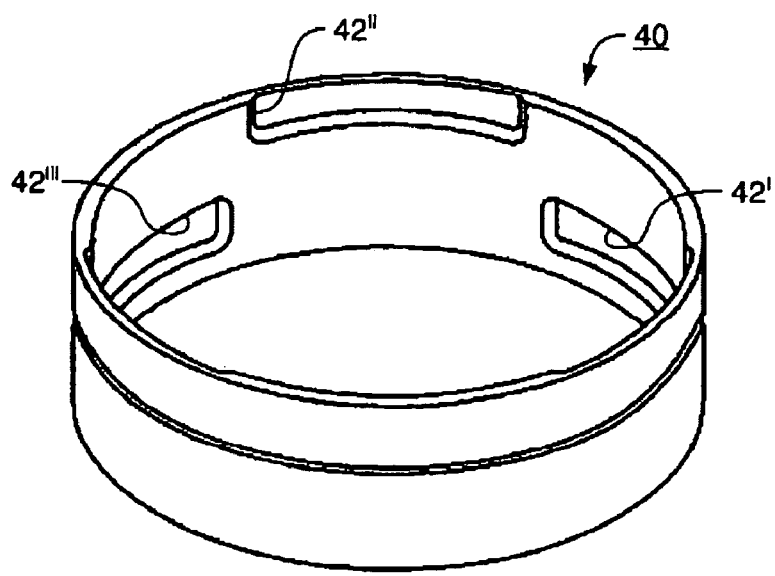
FIG. 9 is a perspective view of carrier ring 40 of FIG. 1.

FIG. 8 is a perspective view of bracing ring 60, which has a trough-formed deformation 62 to guide connector lead 70 of FIG. 1; and FIG. 9 is a perspective view of carrier ring 40 illustrating apertures 42' to 42''' provided therein.

Figure 10:
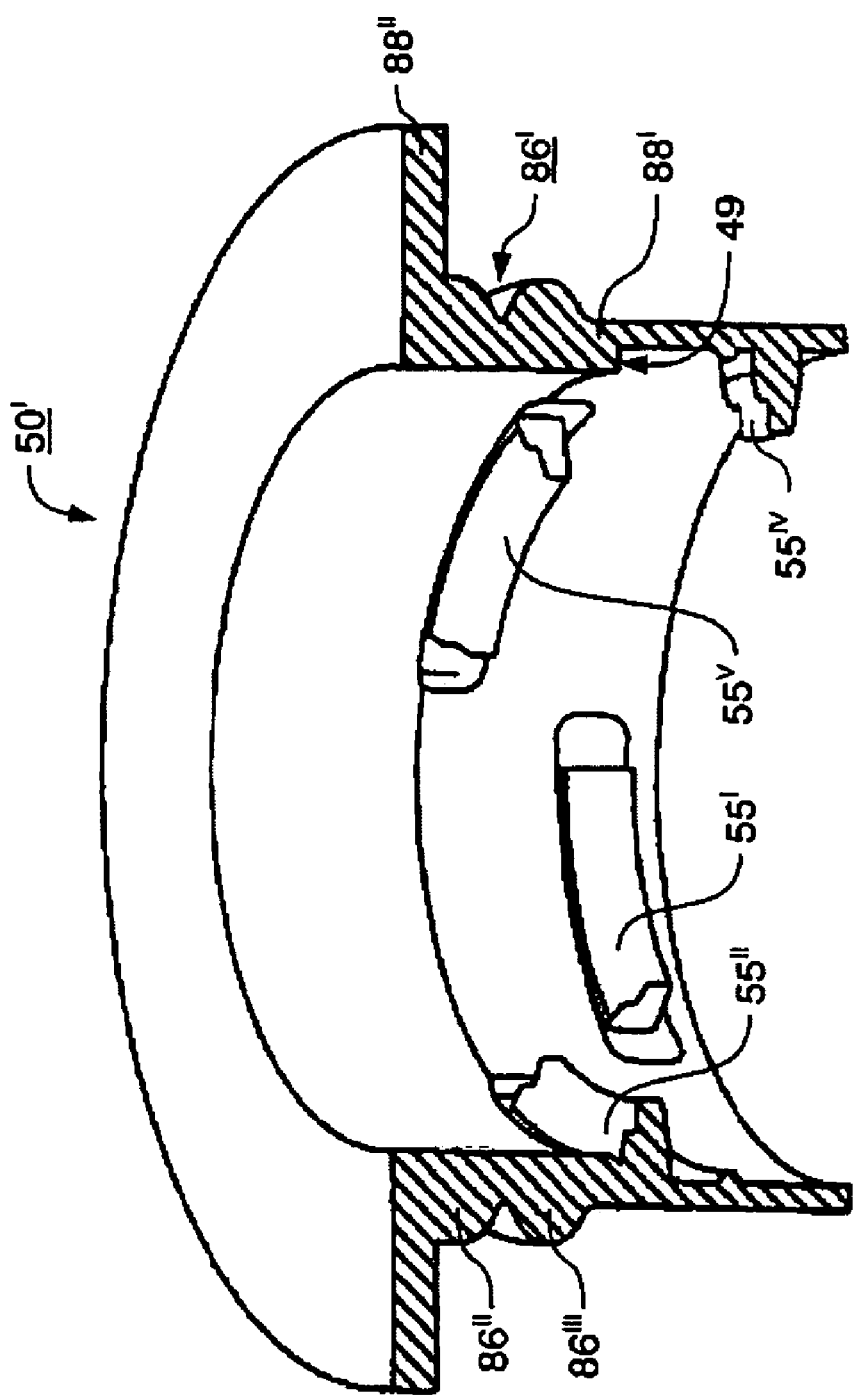
FIG. 10 is a sectioned view of an alternative embodiment of the bellows of FIG. 7.

FIG. 10 shows a tubular extension 50' in accordance with a second embodiment, which is usable with vibration- and noise-damping apparatus 30 instead of extension 50 described above. In contrast to extension 50, tubular extension 50' comprises a modified spring element 86' having a first circumferential bead 86" that joins collar 88" to cylindrical portion 88', and having a second circumferential bead 86''' provided in the upper (in FIG. 10) region of portion 88'. As a result of circumferential beads 86" and 86''', extension 50' has an oscillation characteristic that differs from that of the above-described extension 50 having the oscillation membrane. In other words, spring element 86 or 86' can be configured in different ways, depending on the oscillation characteristic that is required. Many possible configurations of spring element 86 or 86' are accordingly to be understood as part of the invention.

FIGS. 11 to 19 show another embodiment of a fan unit 110. In this, components whose functionality corresponds to the functionality of components of fan unit 10 described with reference to FIGS. 1 to 10 are given the same reference characters as components of fan unit 10, but incremented by 100. The description of such components is accordingly not repeated below in every detail.

Figure 11:
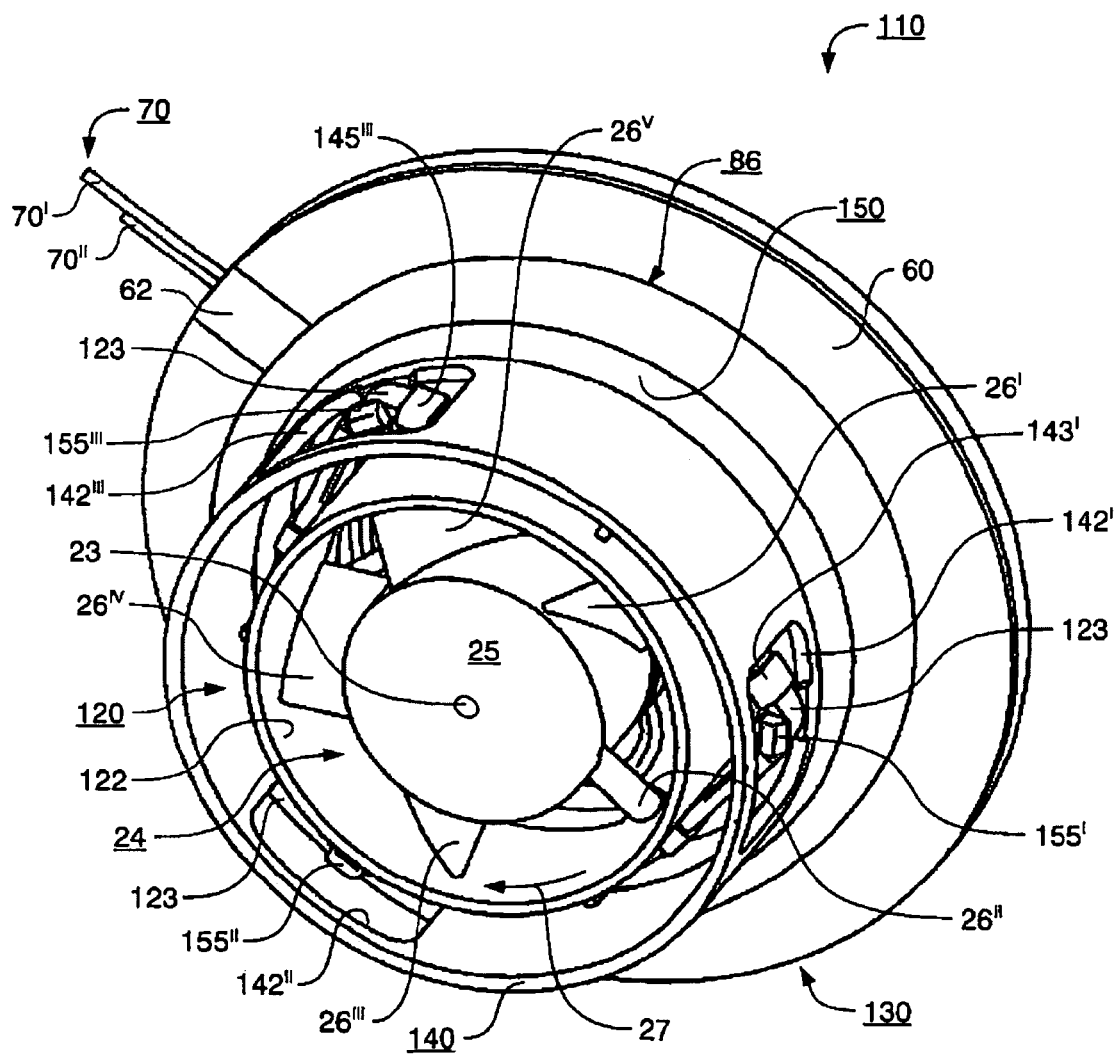
FIG. 11 is a perspective view of a back side of a fan unit having an axial fan, in accordance with a second embodiment.

FIG. 11 shows, in a rear view, a second embodiment of a fan unit 110 having an axial fan 120 and a vibration- and noise-damping apparatus 130.

Figure 13:
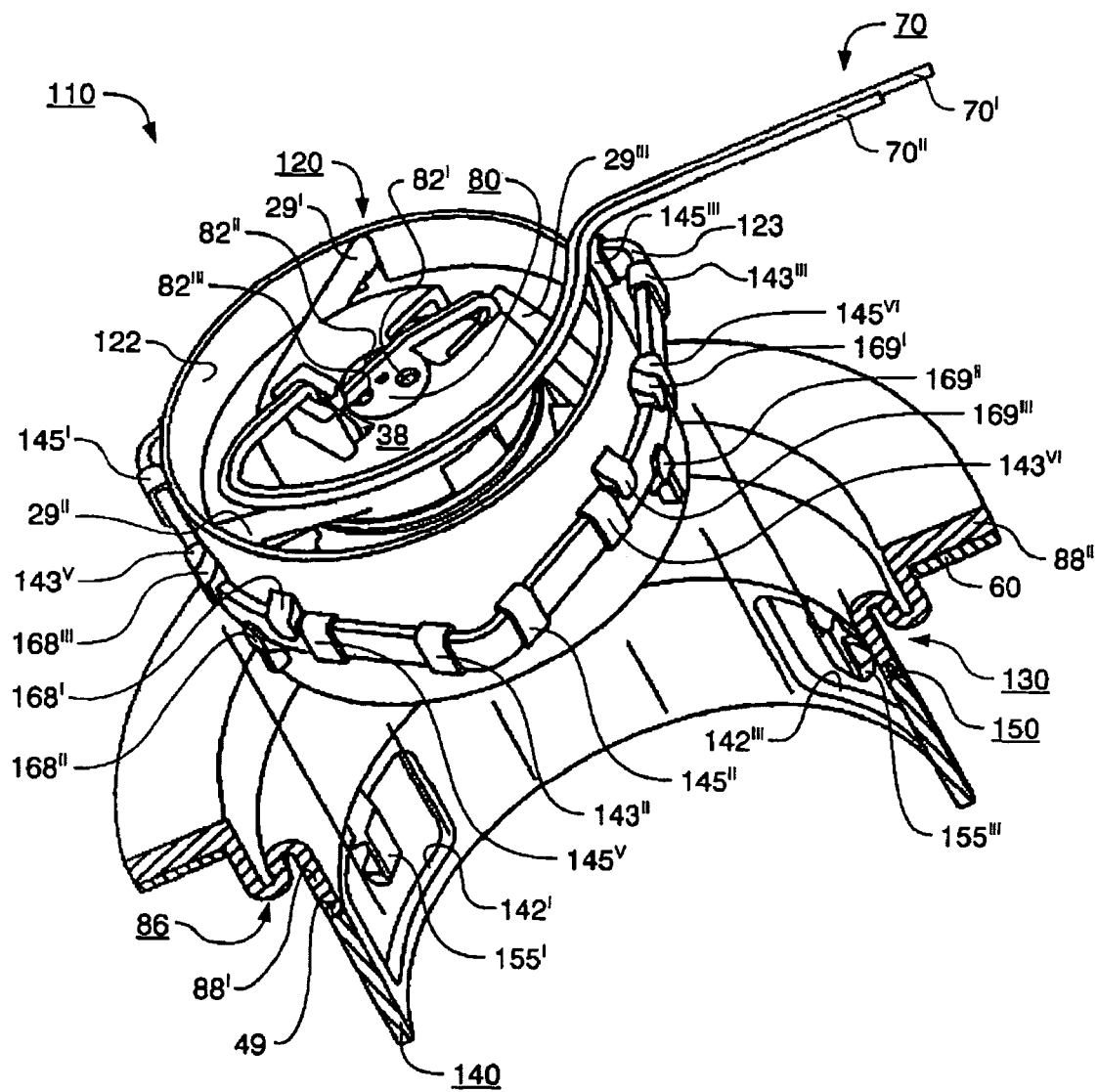
FIG. 13 is a partly sectioned exploded view of the fan unit of FIG. 11.
Figure 14:
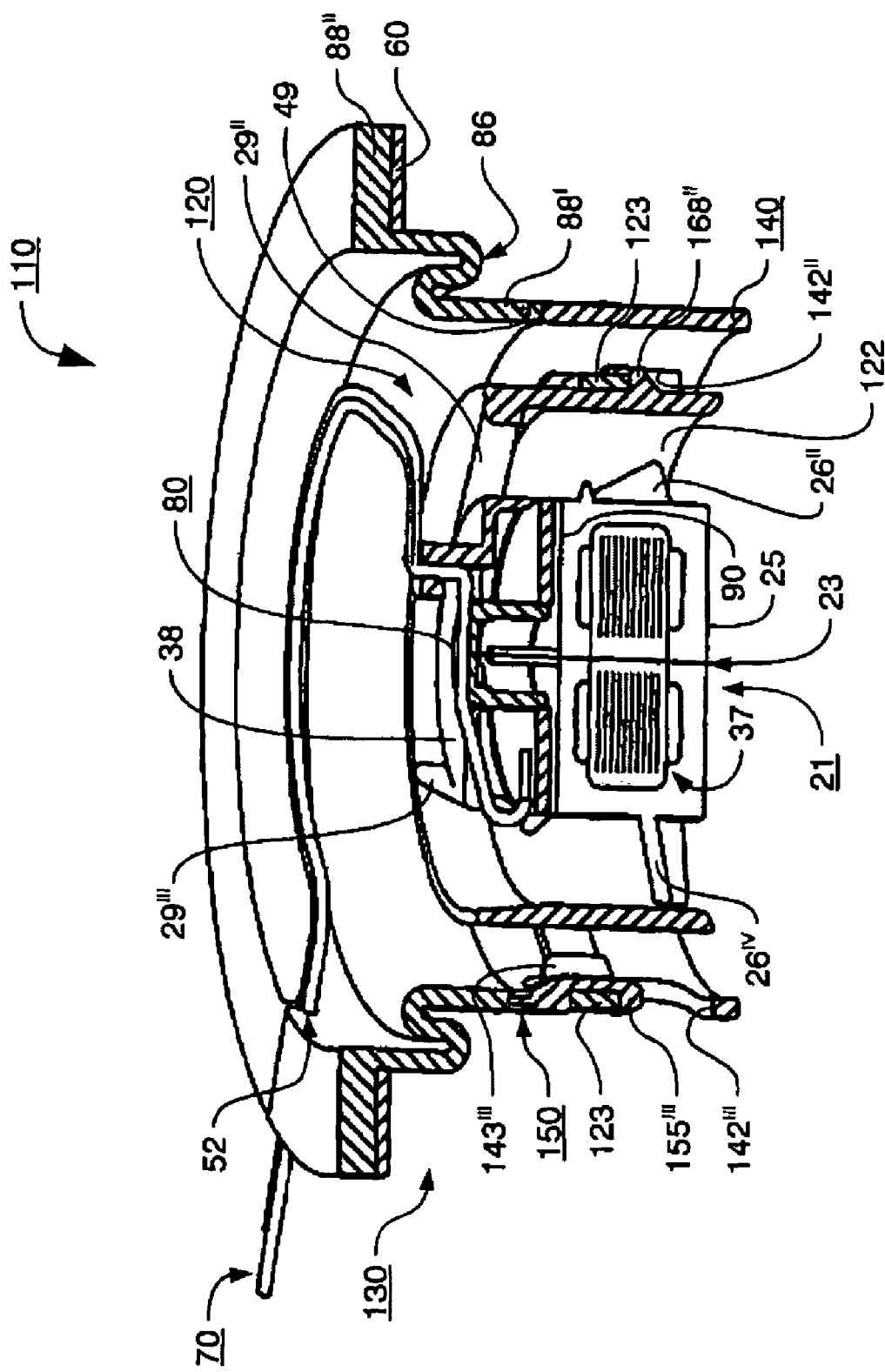
FIG. 14 is a sectioned view of the fan unit of FIG. 11.

Axial fan 120 corresponds substantially to axial fan 20 of the first embodiment having motor 21 shown in FIG. 14, but has a modified air-guiding tube 122. The latter is approximately hollow-cylindrical, can be made from plastic or metal or any mixed form thereof and, as described with reference to FIG. 13, is joined to a suspension member 123 made of an elastomeric material.

Axial fan 120 of FIG. 11 is arranged in vibration- and noise-damping apparatus 130, associated with which are a first ring or carrier ring 140 for elastic suspension of fan 120, a tubular extension 150 joined thereto for oscillation damping, and bracing ring 60. Carrier ring 140, tubular extension 150, and bracing ring 60 are once again preferably implemented as a physical unit using multi-component technology, especially two-plastic technology, carrier ring 140 and bracing ring 60 being manufactured from a hard plastic and tubular extension 150 from a soft material. Carrier ring 140, tubular extension 150, and bracing ring 60 can be joined to one another as described above with reference to FIG. 1.

Spring element 86 (FIG. 13) is provided on extension 150 for oscillation damping. Alternatively, extension 150 can be implemented with spring element 86' described with reference to FIG. 10, or with similar spring elements having a predefined oscillation characteristic.

Several securing members 155' to 155'" (also referred to hereinafter as securing members 155), made of a hard plastic and arranged in lateral apertures 142' to 142'" (hereinafter also referred to as apertures 142) provided for them, are provided for securing suspension member 123. Suspension member 123 is implemented as an annular carrier strip, as described with reference to FIGS. 13 and 16.

Figure 12:
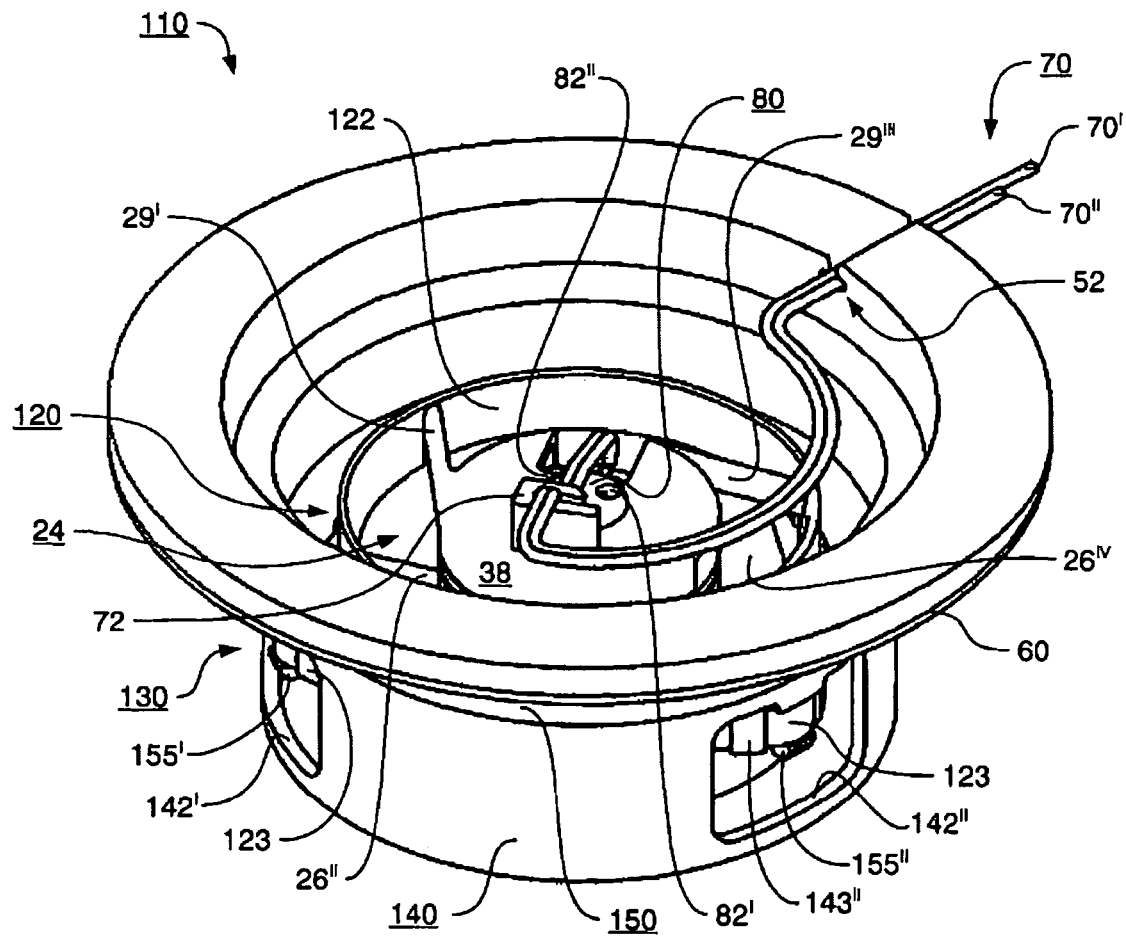
FIG. 12 is a perspective view of the front side of the fan unit of FIG. 11.

FIG. 12 is a front view of fan unit 110 of FIG. 11 illustrating the installation of motor 21 on flange plate 38 that is mounted on air-guiding tube 122, which plate is joined via holding struts 29' to 29$^{III}$ to air-guiding tube 122. Located in plate 38 is bearing element 80, which is equipped with mounting elements 82. FIG. 12 illustrates an example of a cable routing for connector lead 70 via plate 38, holder 72, and opening 52.

FIG. 13 shows an embodiment of the present invention in which securing members 155 are made from a hard plastic and are implemented as components of tubular extension 150. They are arranged in apertures 142, of which only apertures 142' and 142'", having securing members 155' and 155'" respectively, are visible in FIG. 13.

Securing members 155 are depicted in FIG. 13 as hooks on which suspension member 123 is suspended after the assembly of fan unit 110. These hooks are preferably implemented as components of carrier ring 140, in such a way that suspension member 123 engages at least partly into apertures 142.

Suspension member 123 is likewise secured in holding hooks 168', 168", 168'", 169', 169", 169'". These are provided on the outer circumference of carrier ring 140 and are manufactured from a hard plastic; for example as constituents of carrier ring 140. In order to prevent sliding of suspension member 123 during the operation of fan unit 110, stiffening members 143 and 145 are provided on said member; of these, only stiffening members 143", 143'", 143$^V$, 143$^{VI}$, 145', 145", 145'", 145", and 145$^{VI}$ are visible in FIG. 13. They are arranged respectively in the region of securing members 155 and of holding hooks 168', 168", 168'", 169', 169", 169'" in such a way that suspension member 123 is held therein in slipproof fashion.

FIG. 14 is a sectioned view of fan unit 110 in which axial fan 120 is installed in vibration- and noise-damping apparatus 130. FIG. 14 furthermore shows motor 21 with stator arrangement 37.

Figure 15:
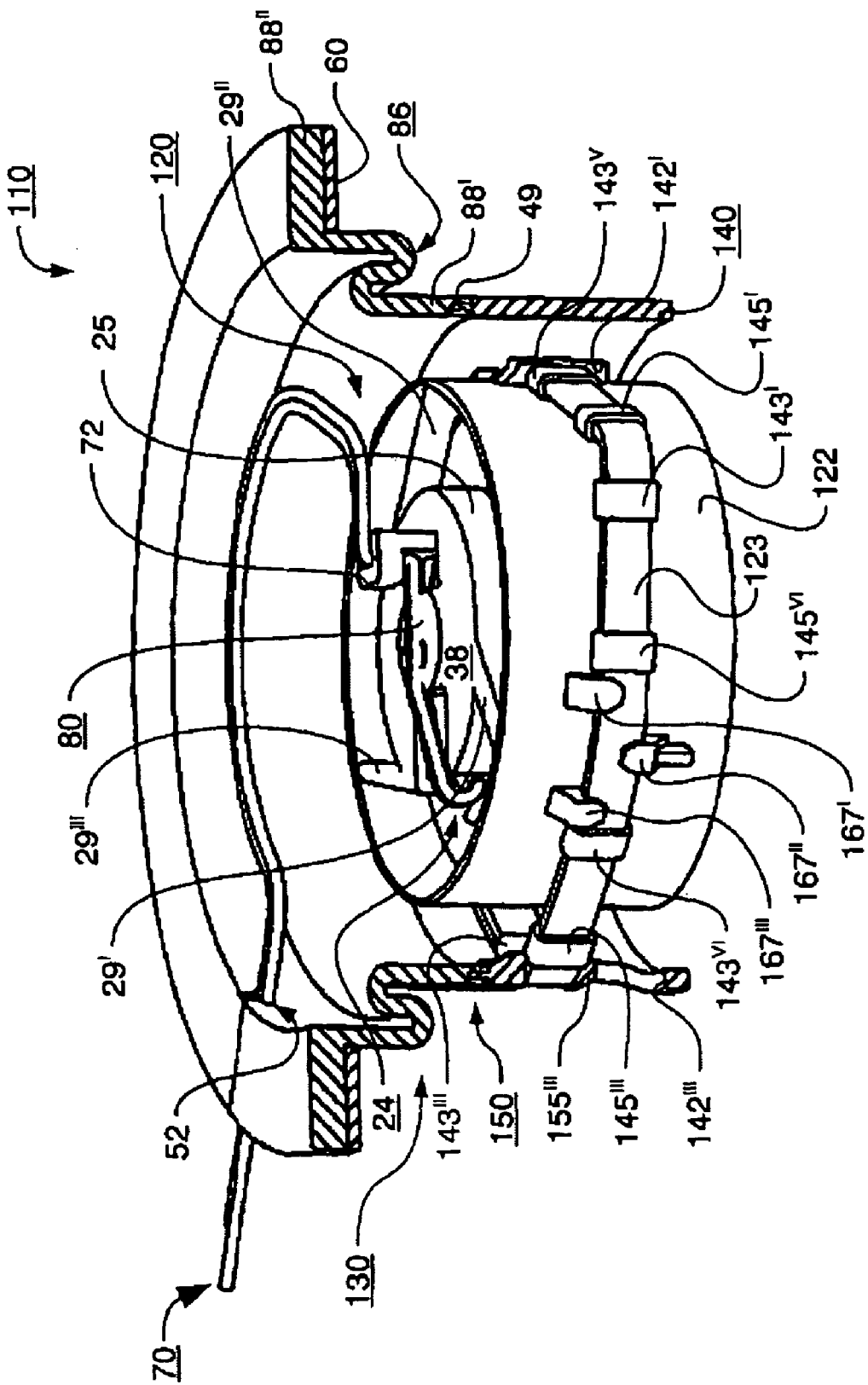
FIG. 15 is a partly sectioned perspective view of the fan unit of FIG. 11.

FIG. 15 is a partly sectioned perspective view of fan unit 110. FIG. 15 illustrates on the one hand annular shoulder 49 provided on tubular extension 150, against which shoulder carrier ring 140 abuts. On the other hand, FIG. 15 illustrates the suspension of air-guiding tube 122 in vibration- and noise-damping apparatus 130 by way of suspension member 123 secured in securing members 155, only securing member 155'" being visible.

Figure 16:
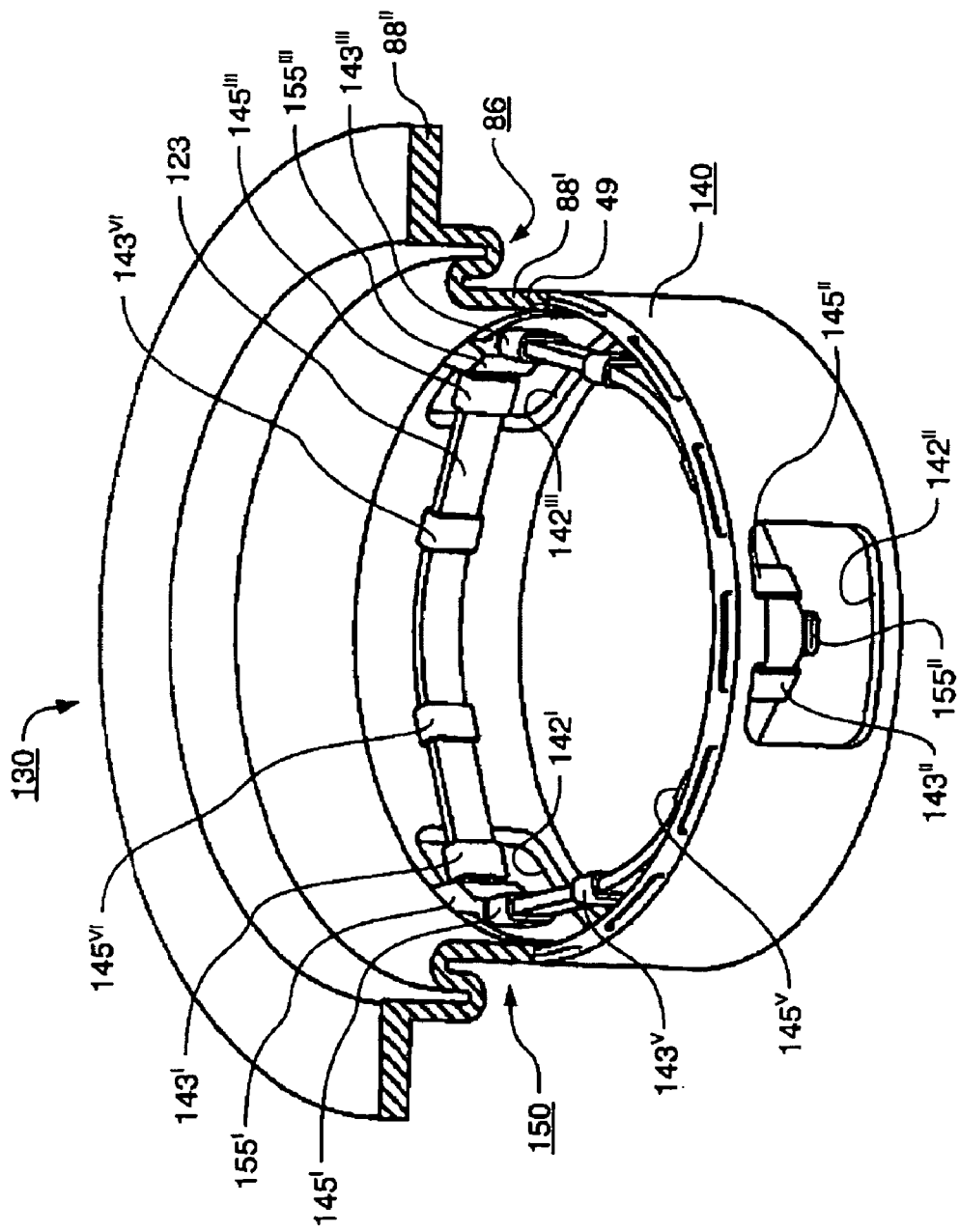
FIG. 16 is a partly sectioned perspective view of the bellows of FIG. 11 joined to the carrier ring.

This suspension is further illustrated in FIG. 16, which omits any depiction of fan 120. It is additionally evident from FIG. 16 that tubular extension 150 abuts against carrier ring 140 or sits on it, without surrounding it. In this embodiment as well, however, tubular extension 150 can be implemented in such a way that it at least partly surrounds carrier ring 140.

Figure 17:
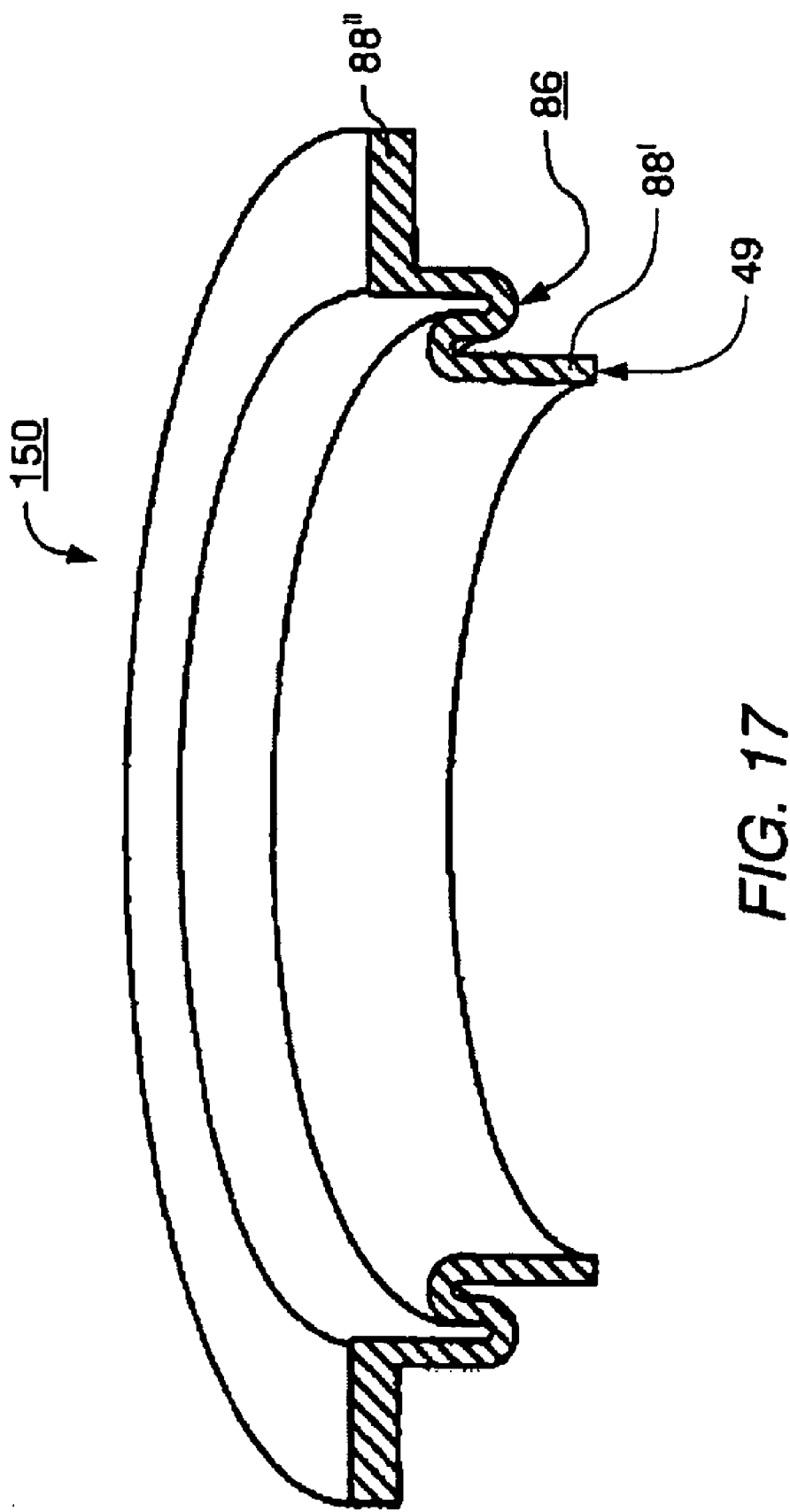
FIG. 17 is a sectioned view of the bellows of FIG. 11.

FIG. 17 is a sectioned view of tubular extension 150, illustrating spring element 86 that is implemented as a curved, approximately S-shaped oscillation membrane. This element can alternatively be implemented, like the modified spring element 86' described above with reference to FIG. 10, with circumferential beads 86" and 86'", or in another different fashion, depending on the oscillation characteristic that is required.

Figure 18:
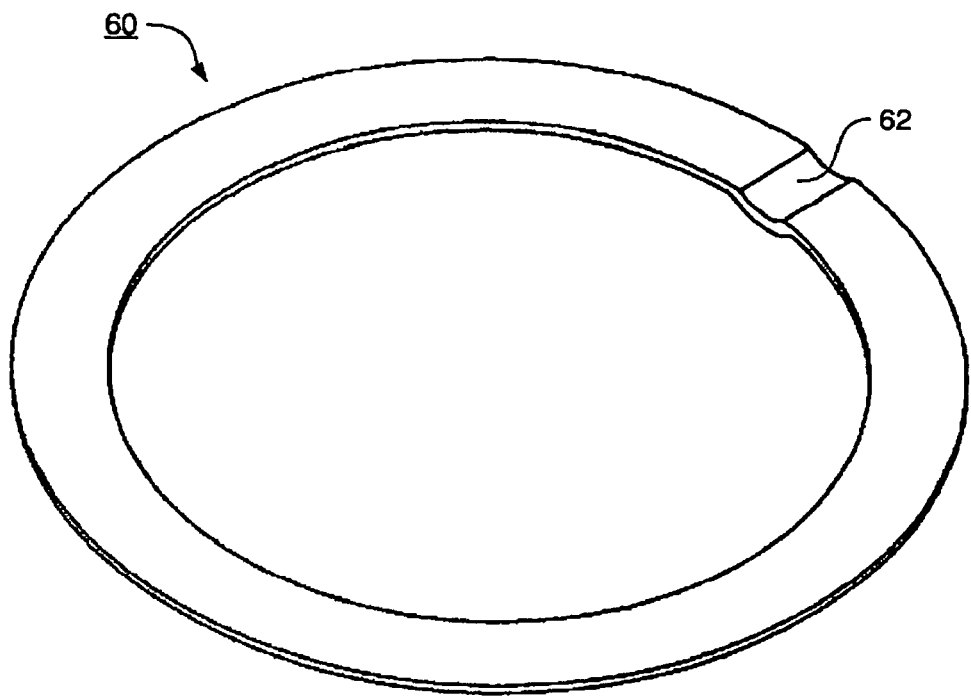
FIG. 18 is a perspective view of bracing ring 60 of FIG. 11.
Figure 19:
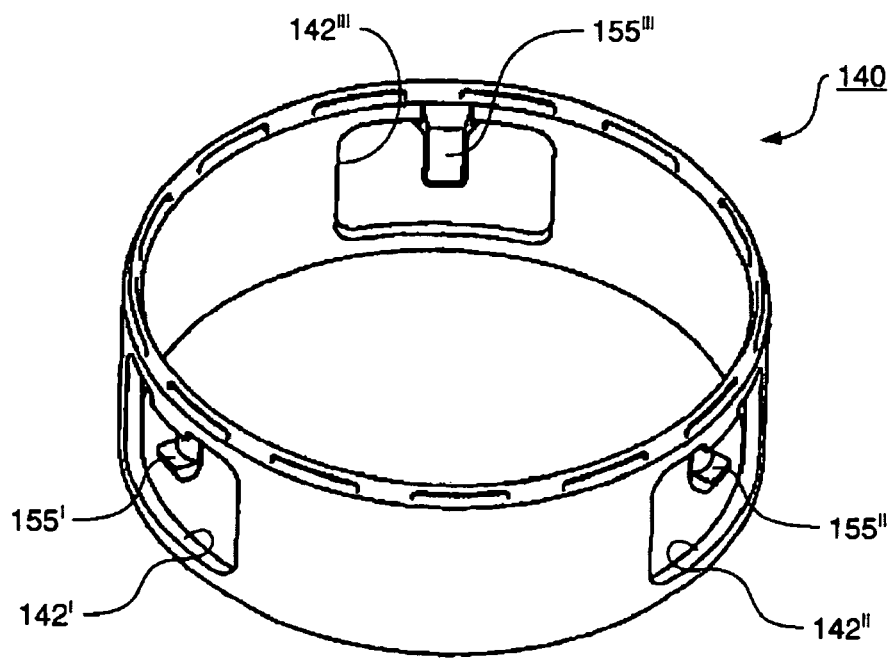
FIG. 19 is a perspective view of carrier ring 140 of FIG. 1.

FIG. 18 is a perspective view of bracing ring 60, which has a trough-formed deformation 62 for guidance of connector lead 70 of FIG. 11; and FIG. 19 is a perspective view of carrier ring 140 illustrating apertures 142' to 142'" provided therein, with securing members 155' to 155'" provided therein and implemented as hooks.

Many variants and modifications are, of course, possible within the scope of the present invention.

What is claimed is:

1. A fan unit having an axial fan (20; 120), associated with which fan is an air-guiding tube (22; 122) through which the fan (20; 120) transports air during operation, said air-guiding tube (22; 122) being joined to at least one suspension member (23; 123) made of an elastomeric material, said suspension member (23; 123) being elastically suspended within a first ring (40; 140) made from a hard plastic, which first ring (40; 140) comprises at least one tubular extension (50, 150) made from a soft plastic, for a noise-damping mechanical connection of the fan unit to a carrier part (15), the tubular extension (50; 150) being connected to a second ring (60) made of a hard plastic, thereby connecting the tubular extension (50; 150) to the carrier part (15).

2. The fan unit according to claim 1, wherein the second ring (60) is connected to an end of the tubular extension (50; 150) which faces toward the carrier part (15).

3. The fan unit according to claim 1, wherein the first ring (40; 140), the tubular extension (50; 150), and the second ring (60) are implemented as an integral unit using multi-component forming technology.

4. The fan unit according to claim 1, wherein the tubular extension (50; 150) further comprises, between the first (40; 140) and the second ring (60), a spring element (86, 86') having a predetermined oscillation characteristic, in order to enable relative motion between the first ring (40; 140) and the second ring (60).

5. The fan unit according to claim 4, wherein the spring element (86) is implemented as a membrane.

6. The fan unit according to claim 5, wherein the spring element (86') is implemented as a circumferential bead (86", 86'").

7. The fan unit according to claim 1, wherein the tubular extension (50; 150) is implemented as a bellows.

8. The fan unit according to claim 1, wherein the tubular extension (50; 150) is joined to at least one of the first ring (40; 140) and the second ring (60) by injection molding.

9. The fan unit according to claim 1, wherein the tubular extension (50; 150) is joined to at least one of the first ring (40; 140) and the second ring (60) by a clamping join.

10. The fan unit according to claim 1, wherein the tubular extension (50; 150) is joined to at least one of the first ring (40; 140) and the second ring (60) by an adhesive join.

11. The fan unit according to claim 1, wherein the tubular extension (50; 150) is joined to at least one of the first ring (40; 140) and the second ring (60) by plastic welding.

12. The fan unit according to claim 1, wherein the first ring (40; 140) is formed with at least one lateral aperture (42; 142) on which a securing member (55; 155) is provided for securing the at least one suspension member (23; 123).

13. The fan unit according to claim 12, wherein the at least one securing member (155) is implemented in a hook shape, and the at least one suspension member (123) is suspended on said securing member (155).

14. The fan unit according to claim 13, wherein the securing member (155) is implemented as an integral constituent of the first ring (140).

15. The fan unit according to claim 12, wherein the at least one suspension member (123) is implemented as an annular carrier strip that is mounted on a plurality of holders (168', 168", 168''', 169', 169", 169''') provided on the air-guiding tube (122).

16. The fan unit according to claim 12, wherein the at least one securing member (55) is implemented as a support element, and the at least one suspension member (23) is at least partly supported on the support element.

17. The fan unit according to claim 16, wherein at least a portion of a suspension member (23) engages into a lateral aperture (42).

18. The fan unit according to claim 16, wherein a suspension member (23) comprises a cutout (28) that is supported on the support element (55).

19. The fan unit according to claim 16, wherein the support element (55) is implemented as a component of the tubular extension (50).

* * * * *